US010634914B1

(12) United States Patent
Smith et al.

(10) Patent No.: US 10,634,914 B1
(45) Date of Patent: Apr. 28, 2020

(54) INFORMATION HANDLING SYSTEM HEAD-MOUNTED DISPLAY CRITICAL SITUATION CONTEXT THROUGH TACTILE MODALITIES

(71) Applicant: Dell Products L.P., Round Rock, TX (US)

(72) Inventors: Hana Schuster Smith, Boulder, CO (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/166,622

(22) Filed: Oct. 22, 2018

(51) Int. Cl.
*G02B 27/01* (2006.01)
*G06F 3/01* (2006.01)
*G08B 21/02* (2006.01)
*G06T 19/00* (2011.01)
*G06K 9/00* (2006.01)

(52) U.S. Cl.
CPC ............ *G02B 27/017* (2013.01); *G06F 3/011* (2013.01); *G06K 9/00671* (2013.01); *G06T 19/006* (2013.01); *G08B 21/02* (2013.01)

(58) Field of Classification Search
CPC .... G02B 27/017; G06T 19/006; G08B 21/02; G06F 3/011; G06K 9/00671
See application file for complete search history.

(56) References Cited

U.S. PATENT DOCUMENTS

2015/0189056 A1\* 7/2015 Magi ................... G06F 1/1652
455/566
2016/0184703 A1\* 6/2016 Brav ..................... G06F 3/012
463/30

OTHER PUBLICATIONS

Fowler, M., "RulesEngine," Jan. 7, 2009, 4 pages, downloaded from https://martinfowler.com/bliki/RulesEngine.html.
Funk, M., "Augmented Reality at the Workplace: A Context-Aware Assistive System Using In-Situ Projection," Universitaat Stuttgart, 2016, 250 pages.
NIST, "NIST Virtual Public Safety Test Environment," downloaded from https://www.herox.com/NISTvr/community, Oct. 22, 2018, 3 pages.

\* cited by examiner

*Primary Examiner* — Aneeta Yodichkas
(74) *Attorney, Agent, or Firm* — Zagorin Cave LLP; Robert W. Holland (57) ABSTRACT

An information handling system enhances end user situational awareness by selectively presenting sensed environmental conditions with tactile feedback, such as with haptic device output at a band worn on the end user's body. Tactile trigger rules apply sensed conditions to detect events that trigger a haptic device notification, such as a threat to the end user in a tactical situation that is not in the field of view of a head-mounted display or that has a lower level of significance relative to other identified threats.

16 Claims, 4 Drawing Sheets

INFORMATION HANDLING SYSTEM HEAD-MOUNTED DISPLAY CRITICAL SITUATION CONTEXT THROUGH TACTILE MODALITIES

BACKGROUND OF THE INVENTION

Field of the Invention

The present invention relates in general to the field of server information handling system augmented reality, and more particularly to an information handling system head-mounted display critical situation context through tactile modalities.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process large amounts of information in a very rapid manner for output to an end user. A typical output device provides information as audiovisual output that an end user observes through visual and auditory senses. In a typical office environment, audiovisual information is presented at a display that includes speakers, generally in response to inputs made through a keyboard, mouse and other input devices. End users may interpret the information by reading words, watching images and listening to audible notifications. Portable information handling systems also tend to include tactile output that alerts an end user based upon touch, such as a vibration provided by a portable telephone when a communication arrives.

In some instances, information presented at a desktop display and speakers can overwhelm an end user so that the end user cannot respond to information in a timely manner. As an example, many games played through an information handling system imitate combat or similar situations with inputs shared through a network to other players. Generally, a desktop information handling system will show the user a simulated situation as if the end user is viewing the situation through the display so that the end user has to adjust a field of view to see the situation along different axes.

Head-mounted displays (HMDs) provide an effective visual output device to allow an end user to quickly change a field of view. A typical HMD includes sensors, such as accelerometers and cameras, that detect an end user's viewing angle so that visual information associated with the viewing angle may be presented as displayed images with a display mounted at the end user's eyes. In virtual reality (VR), an end user is immersed in digitally-generated surroundings while the end user's physical surroundings are completely obscured. Some examples of VR HMDs include the HTC Hive and Oculus Rift. By comparison, augmented reality (AR) and mixed reality (MR) impose digital entities in view of actual physical surroundings. AR HMD behave similar to heads-up displays without perceived interactions with the physical surroundings, such as Google Glass and Recon Jet. MR HMD provides interactions with digital entities by allowing the end user to reach with hand motions to change virtual objects shown essentially as holographic images, such as the Microsoft Hololens, Meta 2, Magic Leap and Avegant Light Field. For example the HMD may include infrared sensors that detect distance to the end user's hands for comparison with the relative position of an image presented at the HMD. Various sensors for detection proximity to objects and motion of the objects may include Near-infrared Spectroscopy (NIR) and doppler sensors. In addition, eye-gaze tracking devices detect end user gaze direction to provide information about what the end user is viewing and, in some cases, to accept end user inputs by a gaze at an input location.

HMDs have real world applications that extend beyond the gaming applications. For instance, Simultaneous Localization and Mapping (SLAM) attempts to construct and update a map of an unknown environment while simultaneously keeping track of an agent's location within it. Inside-out SLAM is defined as SLAM done with cameras mounted on HMDs facing the world-view, such as NIR cameras. To provide sufficient computing power for SLAM, AR HMDs are typically tethered to a portable information handling system carried by the end user, such as with a USB cable and/or wireless protocols like Bluetooth and WiFi.

As an example of real world HMD applications, first responders, such as police and firefighters, wear an HMD wirelessly interfaced with a command post to present real time information as audiovisual information at the HMD. A difficulty that arises in such applications is that the amount of information available for presentation can overwhelm the end user, especially if local sensors also provide real time information for presentation. For example, a police officer might get feedback from an HMD that distinguishes hostile, non-hostile and unknown individuals both within and outside his field of view. In high stress situations, such as at night searching for hostile individuals, HMD information provides an extra set of eyes and ears to alert of possible dangers.

One difficulty is that HMD information may overwhelm the end user resulting in task saturation that negatively impacts situational awareness and response time. The human brain retains a limited amount of information in short-term memory for processing and decision making. For example, early research by Miller in 1956 found that the human brain typically holds only 7+/−2 numbers at a time in short-term memory. Training in specific situations and techniques can increase memory access, such as by chunking numbers in recognized groups. A simple example is a telephone number where the area code and subscriber number are often recalled in chunks. As a further example, research by Samman in 2004 found that using multiple modalities to track information in short-term memory can increase the size available to approximately 19 items.

SUMMARY OF THE INVENTION

Therefore, a need has arisen for a system and method which provides critical situation context at a head-mounted display through tactile modalities.

In accordance with the present invention, a system and method are provided which substantially reduce the disadvantages and problems associated with previous methods and systems for presenting information at a head-mounted display. Alerts issue to an end user based upon sensed conditions with haptic devices coupled along a length about an end user's body, such as integrated in a belt worn around the end user's waist. Providing alerts related to sensed conditions with haptic feedback reduces sensory overload and increases memory capacity to enhance the end user's situational awareness.

More specifically, an information handling system interfaces with a plurality of sensors to detect sensed conditions proximate to an end user, such as camera, infrared, audible, inertial measurement and other sensors. An alert engine analyzes sensed conditions to identify alerts for presentation to the end user. For instance, alerts may relate to detection of individuals and/or conditions of interest to an end user. The alert engine selects from among visual, auditory and tactile alert types to present alerts based upon the type of sensed condition and the number, types and severity of alerts actively presented to the end user. Visual alerts are presented as visual images at a head-mounted display, such as when a sensed condition falls within the field of view of the head-mounted display. Audio alerts are presented with a speaker integrated in the head-mounted display. Tactile alerts are presented by activation of haptic devices in contact with the end user, such as integrated in a belt worn by the end user. For instance, haptic devices are activated to provide the end user with an indication of the direction of the alert, such as based upon the location of the haptic device as worn by the end user, and the severity of the alert, such as based upon the intensity of the haptic output. Selection of a haptic output alert may be based upon a severity associated with the sensed condition, a location of the sensed condition, and the number of alerts presented to the end user.

The present invention provides a number of important technical advantages. One example of an important technical advantage is that an end user's situational awareness is enhanced with reduced sensory overload by spreading alert information across visual, auditory and tactile senses. For example, a belt, armband or other worn device includes haptic devices to provide tactile feedback of alerts at selected positions associated with an alert direction. Tactile alerts provided by a haptic device provide feedback for sensed conditions that fall outside of a field of view of a head-mounted display that presents visual and auditory alerts. For instance, a sensed condition detected behind an end user is indicated with a vibration at the rear of the belt. In instances where multiple alerts have issued with visual indications, haptic device output may also indicate alerts within the field of view of a head-mounted display so that touch senses of the end user are leverage to issue an alert where visual senses of the end user may be experiencing sensory overload. Increased sensory spectrum by including touch senses in the alert system enhances end user memory access and thus end user situational awareness.

Multiple alert modalities, such as visual, audio and tactile modalities, improve end user situational awareness with less risk of sensory overload by providing an increased number of information streams that each adapt well for memory access by the end user. Varied modalities allow for information stream optimization so that information is communicated faster based upon modality. The alert engine selects a modality based upon the usage of each modality so that information is prioritized and communicated as rapidly as an end user can process the information. For instance, auditory communication followed by a verbal response is faster than reading communications and typing a response so that prioritizing audio modalities for first responders frees up hands and vision in an emergency situation faced by a first responder. Further, the availability of varied modalities reduces the need to remove a head-mounted display since visual tasks communications may be shifted to audio or tactile communication. Varied modalities also means less divided attention by avoiding senses relied upon by an end user. For example, alert messages may default to tactile notifications where a military individual relies upon sight and hearing in a combat situation to scan the environment and communicate by radio. This speeds up processing and reaction and provides a memory trigger for the end user to access tactile alerts by visual or audio transfer when the situation allows. Further, tactile alerts provide rich detail like proximity and severity of a threat without impeding hearing or impairing night vision by animated or bright alarms.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Tactile feedback of events detected by an information handling system from sensed conditions adapts to enhance end user situational awareness by managing presented information to avoid sensory overload by the end user. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
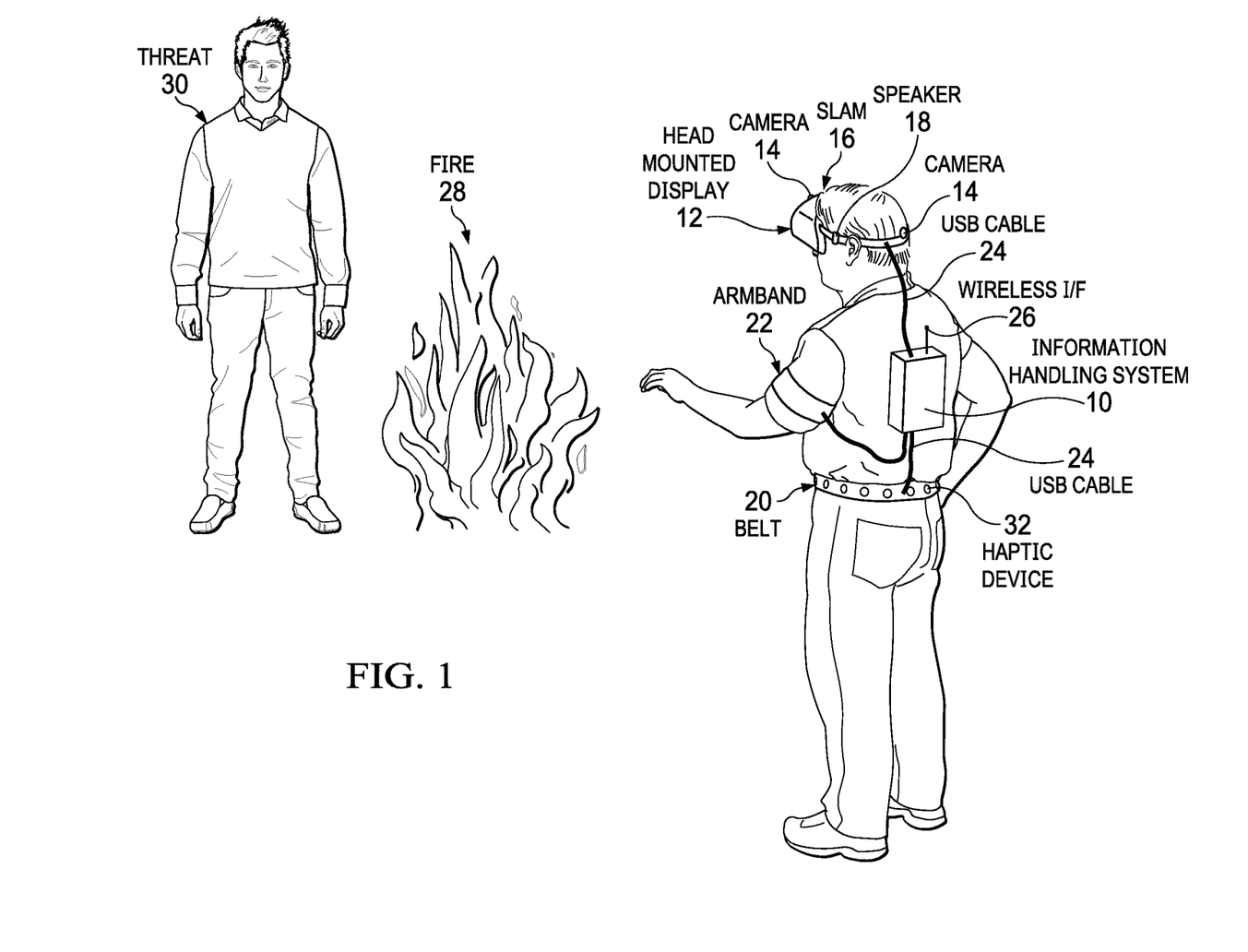
FIG. 1 depicts an exemplary tactical situation for a system that presents alerts to an end user with haptic devices that manage end user sensory intake to enhance end user situational awareness without sensory overload.

Referring now to FIG. 1, an exemplary tactical situation depicts a system for presenting alerts to an end user with haptic devices that manage end user sensory intake to enhance end user situational awareness without sensory overload. In the example embodiment, the end user may be a first responder or military member engaged in a tactical situation or environment that presents plural threats of varied severity. The end user carries an information handling system 10 that processes a variety of inputs to detect threats and conditions in the tactical environment and reports the threats or conditions to the end user to enhance the end user's situational awareness. In the example embodiment, a head-mounted display 12 interfaces with information handling system 10 through a USB cable 24 to present information to the end user as visual images in an augmented reality having the visual images presented over a field of view of the external environment. Head-mounted display 12 includes front and rear looking cameras 14 that capture visual images of the environment and provide the captured visual images to information handling system 10 for analysis. A SLAM camera 16 captures images of infrared light of the environment and provides the captured infrared visual images to information handling system 10. A speaker 18 integrated in head-mounted display 12 presents audible sounds to the end user that are provided from information handling system 10, such as voice from radio communications or alert sounds. A variety of other sensors may be included with head-mounted display 12 and information handling system 10 as described below. The example embodiment depicts head-mounted display 12 and information handling system 10 in separate housings interfaced by a cable, however, alternative embodiments may integrate information handling system 10 within head-mounted display 12 or may use a wireless interface 26 to communicate between head-mounted display 12 and information handling system 10. The example embodiment provides a simplified tactical situation to illustrate situational awareness management by consolidating sensed conditions as alerts adapted to avoid end user sensory overload.

In a tactical situation, the end user has a limited ability to hold in memory conditions captured by the end user's senses and apply the conditions to make decisions. Generally, the end user's situational awareness is defined by the conditions in memory that the end user can apply to make decisions. The conditions primarily include information directly captured by the end user's senses, such as vision, hearing, touch and smell. A sensory overload occurs when the end user cannot process conditions quickly enough to hold conditions in memory for decision making. For example, during stressful conditions an end user may have memory focused on a particular threat so that other sensed conditions fail to garner end user attention as part of the end user's decision making. For instance, a policeman in a firefight may focus so intently on a criminal who discharges a weapon that the policeman does not hear a radio communication about another criminal behind him or a friend nearby and is potentially in the line of fire. Similarly, a fireman entering a burning building to perform a rescue may focus so intently upon a victim in his line of sight that other dangers fall from her attention.

To extend end user memory access to sensed conditions, a belt 20 and/or armband 22 couples to the end user and provides tactile feedback regarding sensed conditions, such as by activation of haptic devices 32 integrated in belt 20 and armband 22. For example, information handling system 10 interfaces through a USB cable 24 or a wireless interface 26 to issue alerts by activating haptic devices 32 as an alternative to issuing visual and/or audio alerts at head-mounted display 12. In the example embodiment, cameras 14 and SLAM 16 capture images of the external environment that include a fire 28 and an armed threat 30. The captured images are provided to information handling system 10 for analysis that identifies threats of plural severity levels. For instance, fire 28 may have a low heat signature captured by SLAM 16 that indicates a less significant threat or an intense and increasing heat signature that indicates a significant threat of an explosion or gas leak. As another example, threat 30 may be an unarmed civilian who indicates a less significant threat, may include a weapon that indicates an increased threat level, or may be accompanied by the sound of a gunshot captured by a microphone to indicate a severe threat level. Detection of different alert types and levels by information handling system 10 may involve alerts within the field of view of head-mounted display 12 so that an end user can directly acquire visual information of the alert or may fall outside of the field of view of head-mounted display 12 so that the end user may not know of the alert unless indicated to her by information handling system 10.

In real time, information handling system 10 manages a combination of modalities based upon sensed context with a goal of managing end user processing of as much relevant information as possible while avoiding sensory overload. User interface overlays and audio alerts are two primary modalities, however, haptic output provides an additional sensory access that, in essence, extends the amount of information accessible by an end user in memory. A haptic output at belt 20 may issue an alert separate from visual and audio alerts to bring the end user's attention on newly-detected conditions and may keep the alert in the end user's memory, such as by maintaining a continuous haptic output until acted upon or dismissed by the end user. Alternatively, haptic devices 32 may enhance visual and audio alerts, such as by providing a haptic output in addition to visual and audio alerts if conditions indicate a severe threat level. In the example embodiment, belt 20 includes plural haptic devices 32 disposed along its length that information handling system 10 activates individually or in groups to indicate sensed conditions including the relative direction of a threat. Further, information handling system 10 may activate haptic devices 32 with different levels of intensity, such as to indicate a level of threat associated with an alert. As an example, detection of a hostile individual from behind the end user who presents a high threat level may activate a haptic device 32 at the rear of belt 20 with a high intensity. As the end user turns around to face the threat, different haptic devices 32 of belt 20 activate to maintain alignment with the threat until the threat falls within the field of view of head-mounted display 12, at which time the threat position may be highlighted with a visual indication with the haptic output ceased.

As set forth below in greater detail, alert modalities are selected by information handling system 10 with a rules-based approach that applies sensed conditions to determine a context and detected threats. Rules to determine alerts and alert modalities are configured so that an end user receives alert information that enhances situational awareness without inducing sensory overload. Rules may adapt over time to a particular individual, such as with machine learning, based upon the individual's ability to process alerts and apply information without experiencing sensory overload. Further, rules may adapt by adjusting on an individual basis the type of alert asserted for a detected condition since different individuals respond to visual auditory and tactile feedback in different ways. Rules may include reporting locally sensed conditions based upon defined threat levels and remotely reported threats, such as threats reported with wireless communications by a command post or information handling systems of other end users in the area. In one example embodiment, an alert rule counts alerts presented by type, such as visual, audio and haptic, and limits the number of alerts both by type and by the total of all types. For instance, if a maximum number of four visual alerts are presented at head-mounted display 12 when an additional alert is detected, the alert rules will issue the additional alert as either an audible alert or a haptic alert. If the additional alert has a higher threat level than the existing alert, the higher threat level alert will replace one of the existing visual alerts and the existing visual alert may be changed into an audio or haptic alert so that the end user has a memory placeholder regarding the alert. In another example, some alerts may be presented through plural alert types. For instance, a high threat level alert, such as an armed man behind the end user, may result in a simultaneous visual, audio and haptic alert. In such a situation, the three alert types may each count as a separate alert that removes other alerts from the end user's attention so that more of the end user's memory capacity and situational awareness are focused on the high threat alert. Specific alert conditions and presentation priorities may be defined and tracked at configuration of the alert rules based upon the type of environment faced by the end user, such as police environment versus a fire environment or a military environment. Although the example embodiment depicts belt 20 and armband 22 as including haptic devices to present haptic output alerts, in alternative embodiments a haptic output alert may be directed by wireless communication to other physical components, such as with a haptic device integrated on weapon, a weapon holder, shoes, a headband, a helmet, a canteen, a visor.

Figure 2:
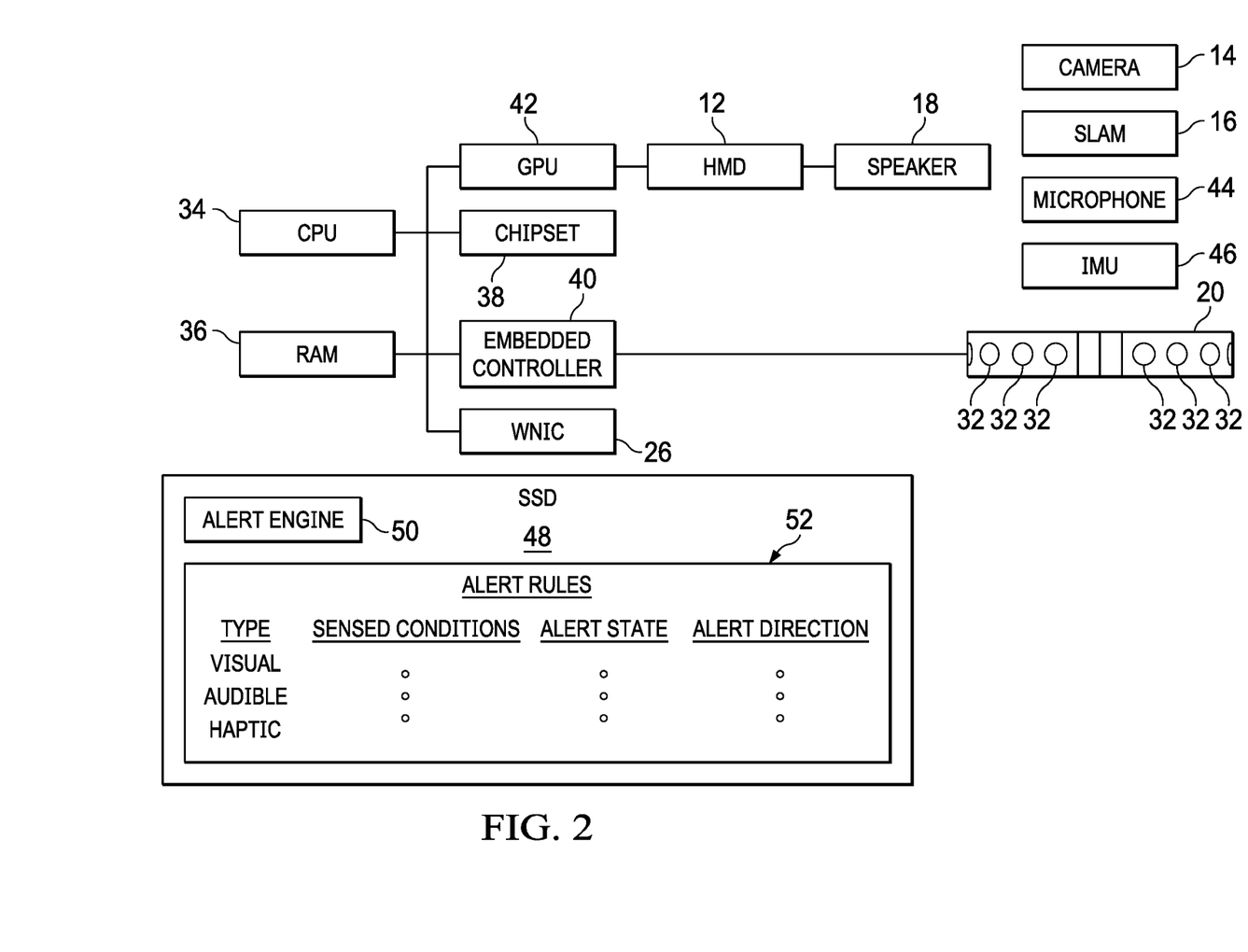
FIG. 2 depicts a block diagram of an information handling system 10 configured to track environmental conditions and issue plural alert types.

Referring now to FIG. 2, a block diagram depicts an information handling system 10 configured to track environmental conditions and issue plural alert types. In the example embodiment, information handling system 10 includes processing components that cooperate to process information, such as by executing instructions of an operating system and applications. A central processing unit (CPU) 34 executes the instructions from random access memory (RAM) 36 to process the information also stored in RAM 36. A chipset 38 interfaces with CPU 34 to support clock and other processing functions, such as providing visual information to a graphics processor unit (GPU) 42, which processes visual information to define images for presentation at a display. An embedded controller 40 manages interactions with peripheral devices and application of power to the processing components. For instance, a wireless network interface card (WNIC) 26 establishes wireless communication with external peripheral devices under the management of embedded controller 40 to provide inputs to CPU 34, such as through keyboard and mouse. In various embodiments, information handling system 10 includes different components that aid in the processing of information with specific configurations of components selected to provide desired processing capability. Generally, to support alerts as described herein, information handling system 10 has a portable configuration, such as a laptop, tablet or headless configuration (i.e. that uses head-mounted display 12 to present visual images).

In the example embodiment, information handling system 10 provides visual information to GPU 42, which defines pixel values for presentation of visual images at head-mounted display 12. Speakers 18 included in head-mounted display 12 present audio information as audible sounds, with audiovisual information provided to head-mounted display 12 through standardized formats, such as USB 3.0, DisplayPort, or various wireless formats. A variety of sensors capture conditions in the environment proximate to head-mounted display 12. In the example embodiment, sensors include multiple cameras 14 that capture visual images at various angles relative to the field of view of head-mounted display 12, a SLAM 16 that captures infrared images, a microphone 44 that captures audible noises and an inertial measurement unit (IMU) 46 that captures accelerations, compass headings, gyroscopic motion and other sensed inertial conditions. In one embodiment, sensors are integrated in head-mounted display 12 to communicate information through a common cable to CPU 34. Alternatively, various wireless interfaces may be used to communicate sensor measurements to CPU 34.

In the example embodiment, belt 20 has plural haptic devices 32 disposed along a length so that each haptic device may be individually commanded by embedded controller 40 to provide a haptic output at a selected frequency and intensity. For example, haptic devices 32 are off-balance rotating devices that generate vibration when rotated by a current sent from a GPIO of embedded controller 40. In alternative embodiments, a system on chip (SOC) disposed in belt with a wireless transceiver selectively activates each haptic device 32 at selected intensity. Belt 20-is sized to fit around an end user's waist, although other length bands may be used, such as to fit around an arm as an armband. In addition, individual haptic devices 32 may include a wireless capability so that an end user can couple an individual haptic device 32 to selected physical items, such as a shoelace or a canteen. For instance, a haptic device alert may be used to remind an end user to stay hydrated.

In the example embodiment, a solid state drive (SSD) 48 provides persistent memory for storing applications that execute on CPU 34, such as non-transitory flash memory. An alert engine stored in SSD 48 is retrieved to CPU 34 to execute and manage alerts issued to an end user. Alert engine 50 applies alert rules 52 to determine the types of alert to issue for sensed conditions. In the example embodiment, alert rules define three alert types to include visual alerts presented as visual images at head-mounted display 12, audible alerts presented as audible sounds at speaker 18 and haptic alerts presented at haptic devices 32. Alerts are associated with sensed conditions, such as images captured by cameras 14, sounds captured by microphone 44, infrared images captured by SLAM 16 and inertial inputs sensed by IMU 46. Sensed conditions may include conclusions reached by analysis of sensed output, such as capture of a weapon in an image or a gunshot by a microphone. As analysis of sensor information produces conclusions, the conclusions are forwarded to alert engine 50 to look up alerts for the sensed conditions within alert rules 52. The alert type and intensity also depends upon the alert state of the alert engine, such as the total number of alerts, the currently issued alerts for other sensed conditions and the priority of the sensed condition relative to other sensed conditions. For example, a known friendly individual captured in a camera image to the rear of an end user might result in an audible and haptic alert if it is the only alert sensed condition while only issuing as a haptic alert if other conditions are sensed. In such a situation, an alert direction determines which haptic device 32 to activate, such as based upon an alignment with the capture image relative to the end user.

Figure 3:
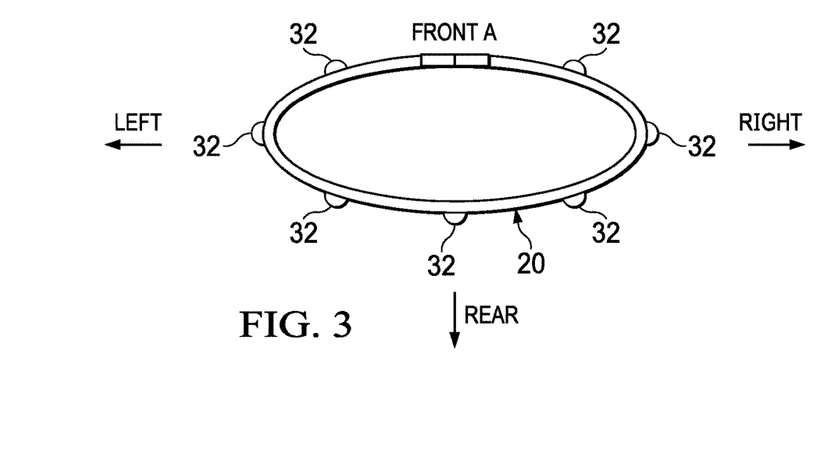
FIG. 3 depicts an example of alerts presented by a head-mounted display and haptic device.

Referring now to FIG. 3, an example of alerts presented by a head-mounted display and haptic device is depicted. In the example embodiment, head-mounted display presents a user interface as an overlay of physical surroundings visible through a transparent cover, such as an augmented reality or mixed reality view. A visual alert 54 in the form of an exclamation point is presented next to fire 28 and threat 30. In various embodiments, different types of visual images presented over the sensed condition may be used to highlight an alert level of the sensed conditions, such as green, yellow and red boxes to mark good, unknown and bad persons in the field of view. Speaker 18 may present audible alerts in combination with visual alerts or separately. A control panel 56 provides management of alerts with a mixed reality interaction. For example, control panel 56 may provide a visual image of belt 20 with the relative positions of haptic devices 32, such as front, back, left and right. An end user may then use hand gestures in a mixed reality interaction to select a haptic device 32 having an associated alert so that more detailed information about the alert is presented. For instance, if the end user has a rear haptic device initiated with low intensity, the end user may gesture at the rear position of belt 20 presented at head-mounted display 12 to select a visual image captured by the camera of the alert condition. In this manner, the haptic devices 32 provide a memory placeholder that keeps alerts in mind for the end user with a rapid check to monitor the alert condition.

Figure 4:
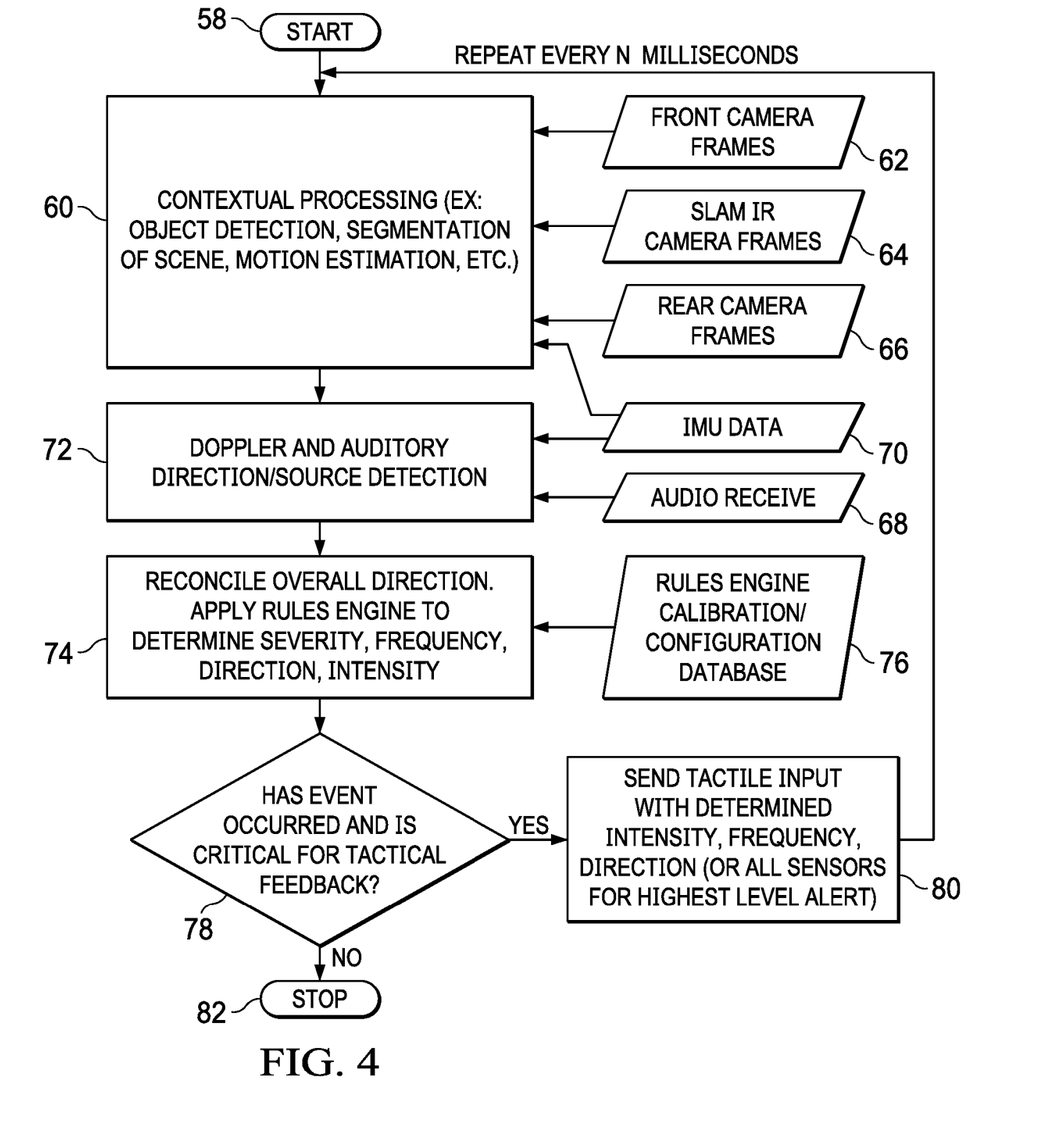
FIG. 4 depicts a flow diagram of a process for configuration and management of alerts by an information handling system.

Referring now to FIG. 4, a flow diagram depicts a process for configuration and management of alerts by an information handling system. The process starts at step 58 and proceeds to step 60 to perform contextual processing based upon sensed conditions. Contextual processing may include object detection, segmentation of a captured scene, motion estimation or other types of processing of sensed information that identifies conditions of interest. In the example embodiment, sensed conditions are provided from a front camera frame 62, a SLAM IR camera frame 64, a rear camera frame 66, and IMU data 70. At step 72 Doppler and auditory direction and source detection are performed with audio information provided by an audio receiver at step 68 and from IMU data 70. For example, Doppler sensing may be applied to detection gestures in support of mixed reality interactions with a menu presented at a head-mounted display. At step 74, the sensed conditions are applied by a rules engine with a calibration and configuration database 76 to reconcile overall direction of a detected condition that is associated with an alert. For example, the rules engine applies sensed conditions to determine an alert severity, frequency, direction and intensity for presentation to an end user. Once the conditions are applied to determine the alert, the process continues to step 78 to determine if the event occurred and is critical for tactical feedback to an end user. For instance, in some instances detected conditions associated with alerts may not issue as alerts where other priority alerts exist. If an alert is to issue, the process continues to step 80 to send a tactile input with the determined intensity, frequency and direction. In instances where a severe alert exists, additional alerts may be provided with audible or visible alert indications. The process ends at step 82.

Although the present invention has been described in detail, it should be understood that various changes, substitutions and alterations can be made hereto without departing from the spirit and scope of the invention as defined by the appended claims.

What is claimed is:

1. An information handling system comprising:
a portable housing;
a processor disposed in the portable housing and operable to execute instructions that process information;
a memory disposed in the portable housing and operable to store the instructions and information;
a persistent storage device interfaced with the processor and storing the instructions in non-transient memory;
a head-mounted display configured to be worn over eyes of an end user, the head-mounted display interfaced with the processor and operable to present the information as visual images displayed over a transparent view of external surrounding;
a speaker interfaced with the processor and operable to present the information as audible sounds;
plural sensors interfaced with the processor and operable to sense conditions external the head-mounted display;
a belt having a length and configured to be worn about a waist of an end user, the belt having plural haptic devices dispersed along the length and interfaced with the processor; and
an alert engine stored in the non-transient memory and configured to execute on the processor, the alert engine applying conditions sensed by the sensors to alert rules to selectively present an alert at the belt as a haptic response;
wherein:
the plural sensors comprise a camera operable to capture visual images to the rear of the head-mounted display; and
the alert engine presents the alert associated with the camera as a haptic response at a rear location of the belt.

2. The information handling system of claim 1 wherein the alert rules associate a direction of one or more of the conditions sensed by the sensors with a location of the plural haptic devices to present the alert at one or more of the haptic devices aligned with the direction of the one or more conditions.

3. The information handling system of claim 2 wherein the alert rules associate a type of one or more of the conditions sensed by the sensors with an intensity of the alert at the one or more haptic devices.

4. The information handling system of claim 1 wherein the alert rules define plural alert types for the conditions sensed by the sensor, including at least a visual alert type presented at the head-mounted display, an audio alert type presented at the speaker and a haptic alert type presented at the belt.

5. The information handling system of claim 4 wherein the alert engine selects the alert type to present based at least in part upon a quantity of alerts currently presented and the type of alerts currently presented.

6. The information handling system of claim 1 wherein the plural haptic devices comprise plural off-balance rotating vibration devices.

7. The information handling system of claim 6 wherein the belt interfaces with the processor through a cable coupled between the portable housing and the belt.

8. The information handling system of claim 6 wherein the belt interfaces with the processor through wireless signals communicated between the belt and the portable housing.

9. A method for presenting alerts from an information handling system, the method comprising:
sensing plural conditions with plural sensors;
applying the sensed conditions to determine plural alerts of plural alert types;
presenting at least one of the plural alerts as a visual image alert type to an end user at a head-mounted display with a visual image presented over external surroundings visible through the head-mounted display;
presenting at least another of the plural alerts to the end user as a haptic output alert type at a belt coupled to the end user;
presenting an alert menu at the head-mounted display having a list of alerts;
detecting an end user hand motion associated with the menu; and
in response to detecting changing the at least another of the plural alerts to present at the head-mounted display instead of the belt.

10. The method of claim 9 wherein the presenting at least another of the plural alerts further comprises:
associating the at least another of the plural alerts with a direction relative to the end user; and
selecting a haptic device aligned with the direction to present the at least another of the plural alerts.

11. The method of claim 10 wherein the presenting at least another of the plural alerts further comprises:
associating the at least another of the plural alerts with an alert level;
presenting the haptic output with an intensity associated with the alert level.

12. The method of claim 9 further comprising:
monitoring alerts presented to the end user by alert type;
detecting an additional alert from the sensed conditions; and
selecting one of the head-mounted display or the haptic output to present the additional alert based in part upon the number of alerts presented of each alert type.

13. The method of claim 9 further comprising:
associating the at least another of the plural alerts with a direction not aligned with the external surroundings visible through the head-mounted display;
detecting movement of the head-mounted display to align with the direction; and
in response to the detecting, presenting the at least another of the plural alerts as a visual image at the head-mounted display.

14. The method of claim 13 further comprising removing the haptic output concurrent with the presenting the at least another of the plural alerts as a visual image at the head-mounted display.

15. An alert system comprising:
a head-mounted display operable to present visual type alerts as visual images over external surroundings visible through the head-mounted display;
a band having plural haptic devices operable to present haptic output alert types as a haptic output at a selected length of the band;
plural sensors operable to sense plural conditions; and
non-transitory memory storing instructions that execute on the processor to:
analyze the sensed plural conditions to detect plural alerts;
apply rules to assign each of the plural alerts at least one alert type of plural alert types;
present at least a visual alert type as a visual image at the head-mounted display; and
present at least a haptic alert type as a haptic output at the band, the haptic alert type includes a direction associated with the sensed conditions, the haptic output having a location on the band associated with the direction;
the alert system further comprising:
a control panel presented on the head-mounted display and having the location on the band selectable by a mixed reality gesture;
wherein selection of the location converts the alert type to a visual alert type presented as a visual image on the head-mounted display.

16. The alert system of claim 15 wherein the haptic alert type includes an alert level, the haptic output set according to the alert level.

* * * * *